United States Patent
Inglis et al.

(10) Patent No.: US 12,197,341 B2
(45) Date of Patent: *Jan. 14, 2025

(54) AFFINITY-BASED CACHE OPERATION FOR A PERSISTENT STORAGE DEVICE

(71) Applicant: Daedalus Cloud LLC, Croton-on-Hudson, NY (US)

(72) Inventors: Stuart John Inglis, Cambridge (NZ); Cameron Ray Simmonds, Cambridge (NZ); Dmitry Lapik, Cambridge (NZ); Chia-Chi Hsu, Cambridge (NZ); Daniel James Nicholas Stokes, Cambridge (NZ); Adam Gworn Kit Fleming, Cambridge (NZ)

(73) Assignee: Daedalus Cloud LLC, Croton-on-Hudson, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/413,341

(22) Filed: Jan. 16, 2024

(65) Prior Publication Data

US 2024/0264945 A1   Aug. 8, 2024

Related U.S. Application Data (63) Continuation of application No. 17/581,521, filed on Jan. 21, 2022, now Pat. No. 11,914,519.

(60) Provisional application No. 63/140,644, filed on Jan. 22, 2021.

(51) Int. Cl.
   G06F 12/0891 (2016.01)
   G06F 3/06 (2006.01)
   G06F 12/02 (2006.01)

(52) U.S. Cl.
   CPC ........ *G06F 12/0891* (2013.01); *G06F 3/0604* (2013.01); *G06F 3/064* (2013.01); *G06F 3/0659* (2013.01); *G06F 3/0673* (2013.01); *G06F 12/0246* (2013.01); *G06F 2212/2542* (2013.01)

(58) Field of Classification Search
   CPC ...... G06F 3/0604; G06F 3/064; G06F 3/0659; G06F 3/0673; G06F 12/0246; G06F 12/0891; G06F 2212/2542
   See application file for complete search history.

(56) References Cited

U.S. PATENT DOCUMENTS

| | | |
|---|---|---|
| 8,621,145 B1 | 12/2013 | Kimmel et al. |
| 9,092,337 B2 | 7/2015 | Nellans et al. |
| 9,507,705 B2 | 11/2016 | Pignatelli |
| 10,802,762 B1 | 10/2020 | Gray et al. |
| 10,831,386 B2 | 11/2020 | Voigt |
| 2004/0093463 A1 | 5/2004 | Shang |
| 2011/0154289 A1* | 6/2011 | Mannarswamy ..... G06F 8/4442 717/110 |
| 2012/0239857 A1 | 9/2012 | Jibbe et al. |

(Continued)

OTHER PUBLICATIONS

Jun. 13, 2022—Extended European Search Report—EP 22152831.8.

*Primary Examiner* — Larry T Mackall (74) *Attorney, Agent, or Firm* — Ascenda Law Group, PC (57) ABSTRACT

Aspects described herein relate to a method comprising: receiving a request to write data to a persistent storage device, the request comprising data; determining an affinity of the data; writing the request to a cache line of a cache; associating the cache line with the affinity of the data; and reporting the data as having been written to the persistent storage device.

20 Claims, 6 Drawing Sheets

(56) References Cited

U.S. PATENT DOCUMENTS

| | | |
|---|---|---|
| 2013/0185488 A1 | 7/2013 | Talagala et al. |
| 2013/0205097 A1 | 8/2013 | Flynn et al. |
| 2015/0261615 A1 | 9/2015 | Peterson et al. |
| 2015/0262632 A1 | 9/2015 | Shelton et al. |
| 2017/0109096 A1 | 4/2017 | Jean et al. |

\* cited by examiner

AFFINITY-BASED CACHE OPERATION FOR A PERSISTENT STORAGE DEVICE

CROSS-REFERENCE TO RELATED APPLICATION

This application is a continuation of U.S. application Ser. No. 17/581,521 filed on Jan. 21, 2022 (now issued as U.S. Pat. No. 11,914,519), which claims priority as a non-provisional of U.S. Provisional Patent Application No. 63/140,644, titled "AFFINITY-BASED CACHE OPERATION FOR A PERSISTENT STORAGE DEVICE" and filed on Jan. 22, 2021, the disclosure of which is incorporated herein by reference in its entirety.

FIELD

This relates to affinity-based cache operation for a persistent storage device.

BACKGROUND

Data is stored on a persistent storage device, such as a number of drives. When data is to be written, a storage controller receives the write request and causes the data to be written onto the persistent storage device. When data is to be read, the storage controller receives the read request and returns the data.

SUMMARY

In a first example embodiment, there is provided a method comprising: receiving a request to write data to a persistent storage device, the request comprising data; determining an affinity of the data; writing the request to a cache line of a cache; associating the cache line with the affinity of the data; and reporting the data as having been written to the persistent storage device.

Preferably, the request further comprises an LBA value, and the affinity of the data is at least a function of the LBA value.

Preferably, the request further comprises a request time, and the affinity of the data is at least a function of the request time.

Preferably, the request further comprises a process identifier and the affinity of the data is at least a function of the process identifier.

Preferably, the request further comprises a central processing unit (CPU) identifier, and the affinity of the data is at least a function of the CPU identifier.

Preferably, the request further comprises a central processing unit (CPU) core identifier and the affinity of the data is at least a function of the CPU core identifier.

Preferably, the cache comprises a plurality of buckets, each bucket comprising a predetermined number of cache lines.

Preferably, the request further comprises: an LBA value, wherein each bucket is associated with a range of LBA values.

Preferably, the method further comprises: determining that data is to be evicted from the cache; generating a stream based on one or more buckets; and writing the stream to the persistent storage device.

Preferably, generating a stream based on one or more buckets comprises: determining one or more buckets based on least recent use.

Preferably, determining that data is to be evicted from the cache comprises: determining that the cache is below a threshold clean capacity.

Preferably, determining that data is to be evicted from the cache comprises determining that a predetermined proportion of the buckets are full above a threshold.

Preferably, the method further comprises: after writing the data to a cache line of a cache, marking the cache line as dirty.

In a second example embodiment, there is provided a system comprising: one or more processors; and a memory; wherein the memory comprises instructions which, when executed by the one or more processors, configure the one or more processors to perform the method of the first example embodiment.

In a third example embodiment, there is provided a system comprising: a memory; and a plurality of NUMA nodes, each NUMA node comprising: at least one CPU core; and at least a portion of the memory is attached to the at least one CPU core, wherein the memory comprises instructions which, when executed by the plurality of NUMA nodes, configures each of the NUMA nodes to perform the method of the first example embodiment.

In a fourth example embodiment, there is provided a non-transitory computer readable medium comprising instructions which, when executed by one or more processors, cause the one or more processors to perform the method of the first example embodiment.

BRIEF DESCRIPTION

The description is framed by way of example with reference to the drawings which show certain embodiments. However, these drawings are provided for illustration only, and do not exhaustively set out all embodiments.

DETAILED DESCRIPTION

Figure 1:
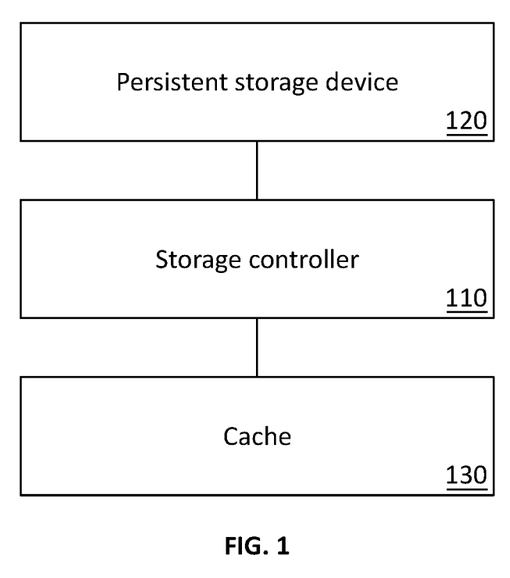
FIG. 1 shows an example storage system.

FIG. 1 shows an example storage system.

The storage controller 110 is in communication with a persistent storage device 120. The persistent storage device 120 is a system for storing data in a persistent manner. Although the persistent storage device is shown as a single component, in practice it generally comprises multiple drives (such as hard disk drives or solid drive drives) arranged into groups and may be distributed over a number of storage nodes. Data is stored across the drives and may have error correcting encoding applied to reduce the risk of data loss if a component of the persistent storage device 120 fails.

Data is stored on the persistent storage devices 120 in blocks. A block is a unit of data of predetermined size, such as 4 KiB (4096 bytes). The storage controller 110 is configured to use logical block addressing (LBA) when receiving requests to interact with the persistent storage device 120. LBA provides that each block of data stored on the persistent storage device 120 is identified by a unique integer LBA value. The storage controller 110 may translate an LBA value to determine which physical location on which drive the data is actually stored on. This translation can allow the storage controller 110 to administer the underlying storage architecture of the persistent storage device 120 freely without external programs being required to record the physical location of the data.

The storage controller 110 is further in communication with a cache 130. The cache comprises non-volatile memory chips configured to operate as a non-volatile cache. This may involve the use of flash memory alone or in combination with conventional volatile memory. The non-volatile memory chips may be configured as non-volatile dual in-line memory modules (NVDIMM).

While the storage controller is described as a single component, in practice the different functions of the storage controller may be split across different entities. For example, interactions with the cache 130 may occur through a cache controller independent of the storage controller 110.

Each storage controller 110 may be associated with a corresponding NUMA (Non-Uniform Memory Access) node. NUMA is a multiprocessing computing system where at least the memory access time depends on the memory location relative to each processor. In some implementations, memory access time depends on the memory location relative to particular cores of a processor. Further access time to particular I/O controllers and the peripherals connected to the I/O controllers can be relative to a particular processor or particular cores of a processor. A NUMA node may be a single CPU (central processing unit), a group of CPUs, a CPU core, a group of CPU cores.

Writing Data

Figure 2:
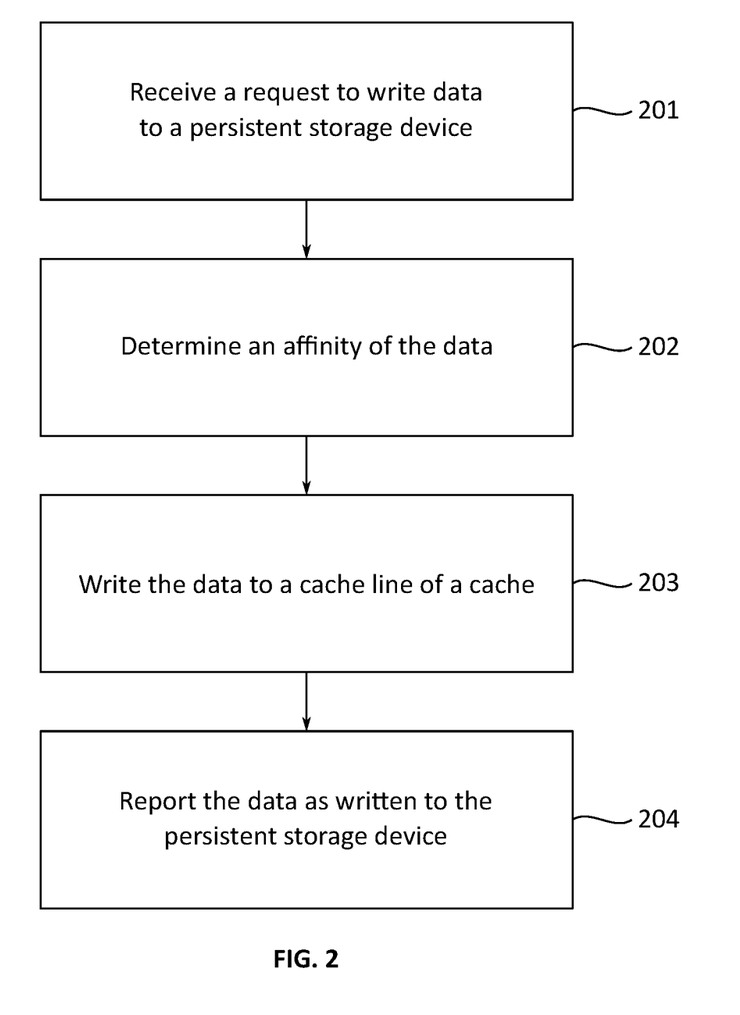
FIG. 2 shows an example approach for writing data.

The storage controller is configured to administer writing data to the persistent storage device. FIG. 2 shows an example approach through which the storage controller can write data.

At step 201, the storage controller receives a request to write data to a persistent storage device.

The request comprises an indication of the data to be stored and an LBA value to indicate where the data should be stored. The request may be in the form of a read instruction from a program running on a processor.

At step 202, the storage controller determines an affinity of the data.

An affinity is an indication of the relationship of the data to other data. The purpose of the affinity is to indicate a likelihood that the two pieces of data are likely to be read at the same time. In one example, the affinity is calculated based on the LBA value. Two pieces of data which have sequential LBA values could have the same affinity since it is likely they would be read sequentially.

Alternatively, the affinity may be calculated as a function of one or more of:

the LBA value;
the time at which the request was received;
a process identifier of the process which issued the request to write data;
a processor identifier of the processor executing the process which issued the request to write data; and
a processor core identifier of the core of the processor executing the process which issued the request to write data.

In such cases, the request received at step 201 may comprise the corresponding data. For example, the request may comprise one or more of: a time, a process identifier, a processor identifier, and/or a processor core identifier.

Such a function may be weighted so as to indicate a relative importance of different parameters.

At step 203, the storage controller writes the data to a cache line of the cache which is associated with the affinity.

The cache lines of the cache may be grouped into a bucket. Each bucket may comprise a predetermined quantity of cache lines. Each bucket stores data with the same affinity.

In one example, the affinity is based on the LBA value, and each bucket is associated with a range of LBA values corresponding to a predetermined storage area (such as 32 MiB) of the persistent storage device.

In writing to a cache line, the corresponding bucket may be locked until the write has completed. This ensures that data is not evicted from the bucket before the new data has been written.

After the storage controller stores the data in the selected cache line, the cache line is then marked dirty. This occurs by updating a bit associated with the cache line. This indicates that data has been stored in the cache line but has not yet been written to the persistent storage device.

At step 204, after the storage controller writes the data to the cache, the storage controller reports the data as having been written to the persistent storage device. This occurs even though the data has not actually been written to the persistent storage device, but only remains as a page in the cache.

This provides a benefit of highly responsive write response without the delay that may otherwise occur when writing to a persistent storage device. In addition, data with affinity tends to be stored in cache lines in the same bucket, which tends to ensure that related data stays together in the cache.

Eviction

Figure 3:
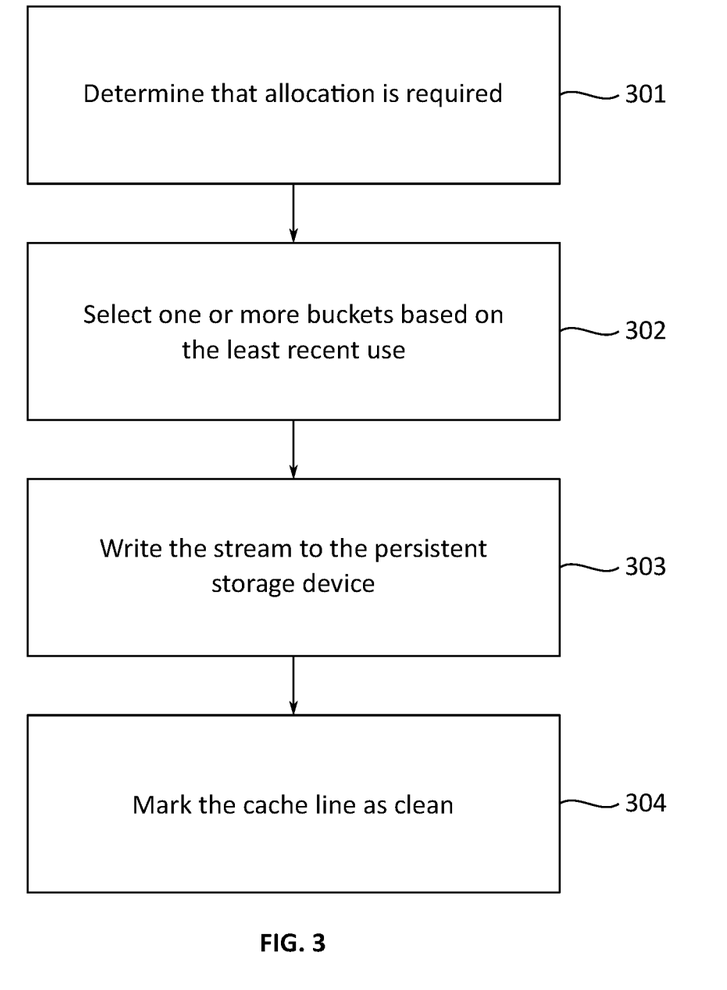
FIG. 3 shows a first example approach for evicting data from a cache.

Periodically, the storage controller may cause data to be moved from the cache to the persistent storage device. This process is called eviction. A first example approach for eviction is shown in FIG. 3.

At step 301, the storage controller determines that allocation is required. This may occur when the storage controller determines that the cache is full. In this context, "full" means that there is at least one clean cache line in the cache for a particular piece of data to be written to (and consequently, there may be at least one clean cache line per bucket). If the cache line is full, the storage controller may evict data from the cache to allow the storage controller to complete a further write.

Alternatively, the storage controller may pre-emptively evict data to retain a certain level of clean capacity. That is, data may be evicted from the cache so that the cache can store a predetermined quantity of data without eviction. For example, it may be that 50% of the overall capacity of the cache should be retained as clean. This allows for improved burst performance in writing, while still allowing the improved read and modify performance for data already in the cache. Such pre-emptive eviction might only occur when the load on the storage controller is relatively low.

At step 302, the storage controller selects one or more buckets based on the least recent use. That is, a bucket whose cache lines have least recently been updated may be selected as the first bucket.

This may occur by the storage controller maintaining a queue of buckets. When a cache line is written, the corresponding bucket is moved to the end of the queue. The queue will then maintain an ordered list of the least recently used buckets.

The number of buckets selected corresponds to the amount of data required in a stream. A stream is a predetermined size of data, which is preferably a multiple of a number of blocks of the persistent storage device. For example, for a block size of 4 KiB, the stream may be selected to be 8192 blocks (or 32 MiB), The stream size may be the same as the maximum bucket size.

If the first selected bucket does not contain enough data stored in its cache lines to meet the stream size, the cache lines of the next bucket are appended to the stream. This continues a stream of the predetermined size can be generated.

At step 303, the storage controller writes the stream to the persistent storage device.

The storage controller preferably causes the stream to be written to a single contiguous area. This may require writing the stream to the persistent storage device in a location different from the LBA values of the blocks in the stream. Consequently, once written, the storage controller may update a mapping between the LBA values of each block and the physical address of the persistent storage device. This allows the data to be addressed using an LBA value independent of the physical address at which the data is stored.

At step 304, after the data has been written to the one or more storage devices, the driver marks the corresponding cache lines as clean. This allows that part of the cache to be reused.

In this way, data is evicted from the cache to free space in the cache when necessary. Since this operates on the basis of the least recently used buckets, data is more likely to be written when a given bucket is no longer being added to. This generally correlates with the storage controller having received all blocks of a given affinity, and therefore allows blocks with affinity to be written contiguously on the persistent storage device.

Figure 4:
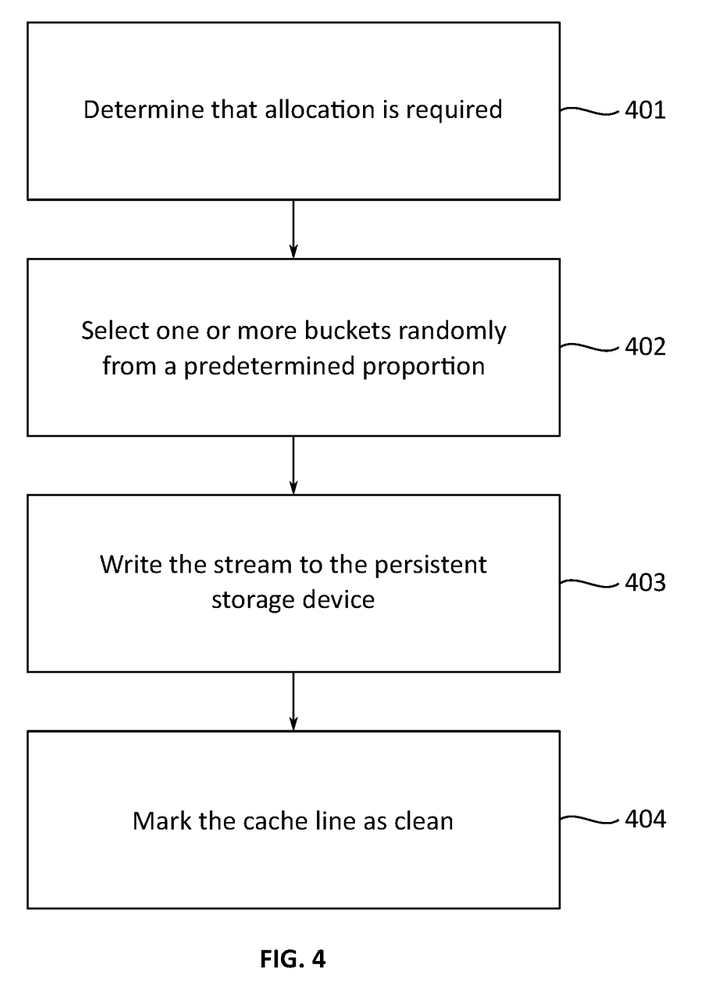
FIG. 4 shows a second example approach for evicting data from a cache.

A second example approach for eviction is shown in FIG. 4.

At step 401, the storage controller determines that eviction is required. This occurs when the number of dirty cache lines in a predetermined proportion of the buckets exceeds a threshold. For example, the predetermined proportion of the buckets may be the least recently used quarter of the buckets. The threshold may be that the predetermined proportion of the buckets exceeds being 50% full.

Additionally or alternatively, the storage controller may determine that a predetermined number of requests to write data have been received. For example, the storage controller may determine that eviction is required after every 10 requests. This may occur only after the number of dirty cache lines in a predetermined proportion of the buckets exceeds a threshold.

At step 402, the storage controller selects one or more buckets randomly from the predetermined proportion of the buckets.

If the first selected bucket does not contain enough data stored in its cache lines to meet the stream size, the cache lines of an additional randomly selected bucket from the predetermined proportion of the buckets are appended to the stream. This continues until a stream of the predetermined size is generated.

At step 403, the storage controller writes the stream to the persistent storage device.

The storage controller preferably causes the stream to be written to a single contiguous area. This may require writing the stream to the persistent storage device in a location different from the LBA values of the blocks in the stream. Consequently, once written, the storage controller may update a mapping between the LBA values of each block and the physical address of the persistent storage device. This allows the data to be addressed using an LBA value independent of the physical address at which the data is stored.

At step 404, after the data has been written to the one or more storage devices, the driver marks the corresponding cache lines as clean. This allows that part of the cache to be reused.

In this way, data is evicted from the cache to free space in the cache when necessary. This occurs partly randomly, which in some cases may result in superior performance.

Subsequent Eviction

After eviction, the full set of dirty cache lines of the last selected bucket (for example, at step 302 or step 402) might not have fit into the stream. In this case, the corresponding bucket may be selected first during the next eviction. The stream of the next eviction may then be written sequentially to the previous stream. This can cause the first portion of the bucket and the second portion of the bucket to be contiguous on the persistent storage device even though they are written separately.

Reading

Figure 5:
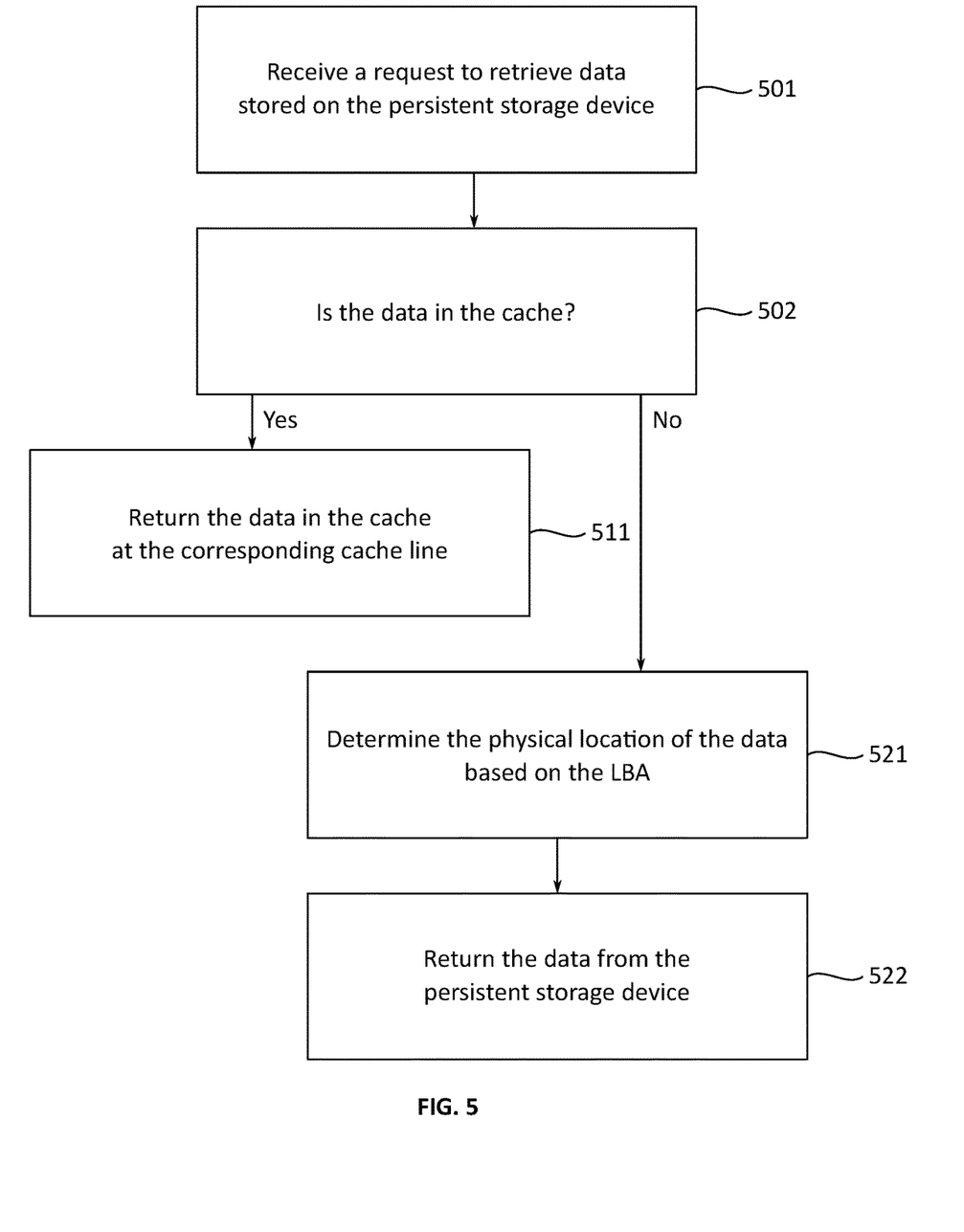
FIG. 5 shows an example approach for reading data.

The storage controller is also configured to administer reading data from the persistent storage device. FIG. 5 shows an example approach through which the storage controller can read data.

At step 501, the storage controller receives a request to retrieve data stored on the persistent storage device.

The request comprises an LBA value to indicate where the data should be read from. The request may be in the form of a read instruction from a program running on a processor, which indicates that the data should be written to a particular memory address.

At step 502, the storage controller determines if the data is in the cache.

This occurs by the storage controller checking the mapping between LBAs and cache lines. If the LBA in the request is in the mapping, then the method proceeds to step 511. If the LBA in the request is not in the mapping, then the method proceeds to step 521.

At step 511, the storage controller returns the data in the cache at the corresponding cache line.

This may occur by copying the data from the cache line to the memory address. The storage controller may then send an indication, such as an interrupt, to the program indicating the read is complete.

At step 521, the storage controller determines the physical location of the data based on the LBA.

For example, the storage controller may maintain a mapping of LBA to physical location. The physical location may be identified as a stripe and a drive. In this case, the storage controller may look up the entry for the LBA in the mapping to determine the physical location.

At step 522, the storage controller returns the data from the persistent storage device. This may occur by obtaining the data from the physical location and writing the data to the memory address. The storage controller may then send an indication, such as an interrupt, to the program indicating the read is complete.

In this way, the storage controller can selectively return data from the cache (which may be relatively fast) or from the persistent storage device (which may be relatively slow). This occurs without the program sending the request being aware of where the data is actually stored. That is, the operation of the cache is transparent to an external program.

System

Figure 6:
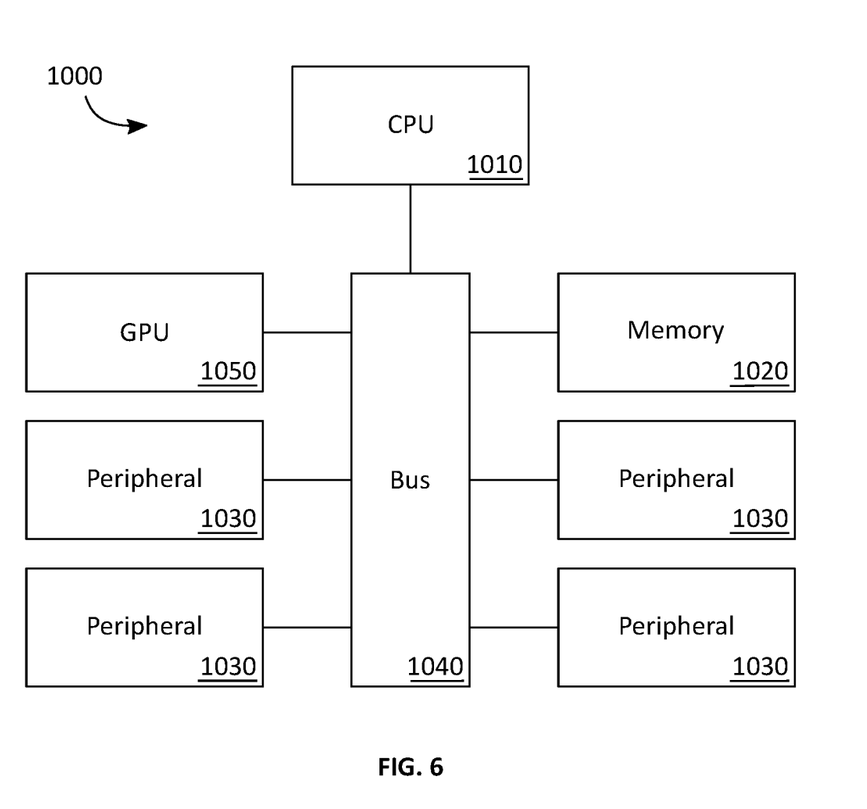
FIG. 6 shows an example system for implementing a storage controller.

FIG. 6 shows an example system which may be used to implement the example storage controller, and therefore the methods noted above.

The system 1000 comprises a CPU (central processing unit) 1010, a main memory 1020, one or more peripherals 1030, and a GPU (graphics processing unit) 1050. The CPU 1010, main memory 1020, peripherals 1030, and GPU 1050 are connected by a bus 1040. In the case of a PCIe (PCI Express) topology, the bus 1040 includes a root complex, and each of the peripherals 1030 and the GPU 1050 are PCIe endpoints. The GPU 1050 can communicate with the peripherals 1030 directly via the bus 1040. In some cases, more than one CPU 1010 and/or more than one GPU 1050 is provided.

The main memory 1020 may be configured to implement the cache, and so may comprise non-volatile memory chips.

The peripherals 1030 may include a persistent storage device (such as hard disk drives, solid state drives, or the like), storage controllers (such as RAID controllers), network controllers (such as network interface cards), switches (such as PCIe switches configured to connect further peripherals), or any of a variety of devices.

Computer system 1000 may be used to implement the methods noted above. For example, CPU 1010 and/or GPU 1050 may run a program which operates as the storage controller.

Interpretation

A number of methods have been described above. Any of these methods may be embodied in a series of instructions, which may form a computer program. These instructions, or this computer program, may be stored on a computer readable medium, which may be non-transitory. When executed, these instructions or this program cause a processor to perform the described methods.

Where an approach has been described as being implemented by a processor, this may comprise a plurality of processors. That is, at least in the case of processors, the singular should be interpreted as including the plural. Where methods comprise multiple steps, different steps or different parts of a step may be performed by different processors.

The steps of the methods have been described in a particular order for ease of understanding. However, the steps can be performed in a different order from that specified, or with steps being performed in parallel. This is the case in all methods except where one step is dependent on another having been performed.

The term "comprises" and other grammatical forms is intended to have an inclusive meaning unless otherwise noted. That is, they should be taken to mean an inclusion of the listed components, and possibly of other non-specified components or elements.

While the present invention has been explained by the description of certain embodiments, the invention is not restricted to these embodiments. It is possible to modify these embodiments without departing from the spirit or scope of the invention.

What is claimed is:

1. A method comprising:
   receiving a request to write first data to a persistent storage device, the request comprising the first data and a process identifier;
   determining an affinity of the first data, wherein the affinity of the first data is at least a function of the process identifier;
   writing the request to a cache line of a cache;
   associating the cache line with the affinity of the first data; and
   reporting the first data as having been written to the persistent storage device.

2. The method of claim 1, further comprising:
   determining that second data is to be evicted from the cache;
   generating a stream based on one or more buckets; and
   writing the stream to the persistent storage device.

3. The method of claim 2, wherein generating the stream based on the one or more buckets comprises determining the one or more buckets based on a least recently used (LRU) policy.

4. The method of claim 2, wherein generating the stream based on the one or more buckets comprises selecting the one or more buckets randomly from a predetermined proportion of the one or more buckets.

5. The method of claim 2, wherein determining that the second data is to be evicted from the cache comprises determining that the cache is below a threshold clean capacity.

6. The method of claim 2, wherein determining that the second data is to be evicted from the cache comprises determining that a predetermined proportion of the one or more buckets are full above a threshold.

7. The method of claim 1, further comprising after writing the first data to the cache line of the cache, marking the cache line as dirty.

8. A method comprising:
   receiving a request to write first data to a persistent storage device, the request comprising the first data and a central processing unit (CPU) identifier;
   determining an affinity of the first data, wherein the affinity of the first data is at least a function of the CPU identifier;
   writing the request to a cache line of a cache;
   associating the cache line with the affinity of the first data; and
   reporting the first data as having been written to the persistent storage device.

9. The method of claim 8, further comprising:
   determining that second data is to be evicted from the cache;
   generating a stream based on one or more buckets; and
   writing the stream to the persistent storage device.

10. The method of claim 9, wherein generating the stream based on the one or more buckets comprises determining the one or more buckets based on a least recently used (LRU) policy.

11. The method of claim 9, wherein generating the stream based on the one or more buckets comprises selecting the one or more buckets randomly from a predetermined proportion of the one or more buckets.

12. The method of claim 9, wherein determining that the second data is to be evicted from the cache comprises determining that the cache is below a threshold clean capacity.

13. The method of claim 9, wherein determining that the second data is to be evicted from the cache comprises determining that a predetermined proportion of the one or more buckets are full above a threshold.

14. The method of claim 8, further comprising after writing the first data to the cache line of the cache, marking the cache line as dirty.

15. A method comprising:
   receiving a request to write first data to a persistent storage device, the request comprising the first data and a central processing unit (CPU) core identifier;
   determining an affinity of the first data, wherein the affinity of the first data is at least a function of the CPU core identifier;
   writing the request to a cache line of a cache;
   associating the cache line with the affinity of the first data; and reporting the first data as having been written to the persistent storage device.

16. The method of claim 15, further comprising:
determining that second data is to be evicted from the cache;
generating a stream based on one or more buckets; and
writing the stream to the persistent storage device.

17. The method of claim 16, wherein generating the stream based on the one or more buckets comprises determining the one or more buckets based on a least recently used (LRU) policy.

18. The method of claim 16, wherein generating the stream based on the one or more buckets comprises selecting the one or more buckets randomly from a predetermined proportion of the one or more buckets.

19. The method of claim 16, wherein determining that the second data is to be evicted from the cache comprises determining that the cache is below a threshold clean capacity.

20. The method of claim 15, wherein determining that the second data is to be evicted from the cache comprises determining that a predetermined proportion of the one or more buckets are full above a threshold.

* * * * *